United States Patent
Mills et al.

(10) Patent No.: US 12,106,206 B2
(45) Date of Patent: Oct. 1, 2024

(54) MULTI-OPERATIONAL MODES OF NEURAL ENGINE CIRCUIT

(71) Applicant: Apple Inc., Cupertino, CA (US)

(72) Inventors: Christopher L. Mills, Saratoga, CA (US); Sung Hee Park, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 893 days.

(21) Appl. No.: 17/148,432

(22) Filed: Jan. 13, 2021

(65) Prior Publication Data

US 2022/0222510 A1 Jul. 14, 2022

(51) Int. Cl.
*G06F 7/24* (2006.01)
*G06F 7/50* (2006.01)
*G06F 7/523* (2006.01)
*G06F 7/544* (2006.01)
*G06N 3/063* (2023.01)

(52) U.S. Cl.
CPC .............. *G06N 3/063* (2013.01); *G06F 7/24* (2013.01); *G06F 7/50* (2013.01); *G06F 7/523* (2013.01); *G06F 7/5443* (2013.01)

(58) Field of Classification Search
CPC .......... G06F 7/24; G06F 7/5443; G06N 3/063
See application file for complete search history.

(56) References Cited

U.S. PATENT DOCUMENTS

| 5,734,921 | A | 3/1998 | Dapp et al. |
| 2020/0019374 | A1* | 1/2020 | Prathapan ............... G06F 5/065 |
| 2020/0211147 | A1 | 7/2020 | Doyle et al. |
| 2020/0249996 | A1* | 8/2020 | Kumar Addepalli .. G06N 3/063 |
| 2020/0257752 | A1 | 8/2020 | Liu et al. |
| 2020/0341758 | A1* | 10/2020 | Wan ...................... G06F 9/3802 |

OTHER PUBLICATIONS

K. E. Batcher. 1968. Sorting networks and their applications. In Proceedings of the Apr. 30-May 2, 1968, spring joint computer conference (AFIPS '68 (Spring)). Association for Computing Machinery, New York, NY, USA, 307-314. (Year: 1968).*

(Continued)

*Primary Examiner* — Tan V Mai
(74) *Attorney, Agent, or Firm* — Sterne, Kessler, Goldstein & Fox P.L.L.C.

(57) ABSTRACT

Embodiments relate to a neural engine circuit of a neural network processor circuit that performs a convolution operation on input data in a first mode and a parallel sorting operation on input data in a second mode. The neural engine circuit includes a plurality of operation circuits and an accumulator circuit coupled to the plurality of operation circuits. The plurality of operation circuits receives input data. In the first mode, the plurality of operation circuits performs multiply-add operations of a convolution on the input data using a kernel. In the second mode, the plurality of operation circuits performs a portion of a parallel sorting operation on the input data. In the first mode, the accumulator circuit receives and stores first results of the multiply-add operations. In the second mode, the accumulator circuit receives and stores second results of the parallel sorting operation.

20 Claims, 8 Drawing Sheets

(56) References Cited

OTHER PUBLICATIONS

Calderoni, G., "Hardware Acceleration for AI Robust pose estimation and neural networks," University of Turin, Master Degree Thesis, 2019, pp. 1-144.
PCT International Search Report and Written Opinion, PCT Application No. PCT/US2021/065507, Apr. 29, 2022, 20 pages.
Shi, S. "FusionAccel: A General Re-Configurable Deep learning Inference Accelerator in FPGA for Convolutional Neural Networks." Cornell University Library, arXiv:1907.02217v1, Jul. 4, 2019, pp. 1-26.
Zhang, Y. et al. "When Sorting Network Meets Parallel Bitstreams: A Fault-Tolerant Parallel Ternary Neural Network Accelerator Based on Stochastic Computing." 2020 Design, Automation & Test in Europe Conference & Exhibition (DATE), Mar. 9-13, 2020, pp. 1287-1290.

\* cited by examiner

MULTI-OPERATIONAL MODES OF NEURAL ENGINE CIRCUIT

BACKGROUND

1. Field of the Disclosure

The present disclosure relates a circuit for performing operations related to neural networks, and more specifically to a neural engine circuit that performs a convolution operation in one mode and a parallel sorting operation in another mode.

2. Description of the Related Arts

An artificial neural network (ANN) is a computing system or model that uses a collection of connected nodes to process input data. The ANN is typically organized into layers where different layers perform different types of transformation on their input. Extensions or variants of ANN such as convolution neural network (CNN), recurrent neural networks (RNN) and deep belief networks (DBN) have come to receive much attention. These computing systems or models often involve extensive computing operations including multiplication and accumulation. For example, CNN is a class of machine learning technique that primarily uses convolution between input data and kernel data, which can be decomposed into multiplication and accumulation operations.

Depending on the types of input data and operations to be performed, these machine learning systems or models can be configured differently. Such varying configuration would include, for example, pre-processing operations, the number of channels in input data, kernel data to be used, non-linear function to be applied to convolution result, and applying of various post-processing operations. Using a central processing unit (CPU) and its main memory to instantiate and execute machine learning systems or models of various configuration is relatively easy because such systems or models can be instantiated with mere updates to code. However, relying solely on the CPU for various operations of these machine learning systems or models would consume significant bandwidth of a central processing unit (CPU) as well as increase the overall power consumption.

SUMMARY

Embodiments relate to a neural engine circuit of a neural network processor circuit that performs a convolution operation on input data in a first mode and a parallel sorting operation on input data in a second mode. The neural engine circuit includes a plurality of operation circuits and an accumulator circuit coupled to the outputs of the plurality of operation circuits. The operation circuits receive input data. In the first mode, the plurality of operation circuits performs multiply-add operations of a convolution on input data using a kernel. In the second mode, the plurality of operation circuits performs a portion of a parallel sorting operation on input data. In the first mode, the accumulator circuit receives and stores first results of the multiply-add operations. In the second mode, the accumulator circuit receives and stores second results of the parallel sorting operation.

In one or more embodiments, the second results of the parallel sorting operation are sent to the plurality of operation circuits, in the second mode, to perform a subsequent portion of the parallel sorting operation.

In one or more embodiments, the parallel sorting operation implements a bitonic sorting network that simultaneously produces a maximum value and a minimum value of the input data.

In one or more embodiment, the accumulator circuit, in the second mode, receives and stores an index for a maximum value of the input data and an index for a minimum value of the input data.

In one or more embodiments, each of the operation circuits includes, a multiplier circuit, an adder circuit and a comparator circuit. The multiplier circuit receives and performs a multiplication operation on a portion of the input data and a portion of the kernel in the first mode. The adder circuit is coupled to the multiplier circuit and the accumulator circuit. The adder circuit receives and performs an adding operation on the stored first result and a value derived from the multiplication operation in the first mode. The comparator circuit is coupled to the accumulator circuit. The comparator circuit receives and performs a comparison operation on a portion of the input data and the stored second result in the second mode.

In one or more embodiments, the neural engine circuit further includes an input buffer circuit coupled to the operation circuits to provide different sets of the input data to the plurality of operation circuits in different cycles of the neural engine circuit.

In one or more embodiments, another neural engine circuit performs another portion of the parallel sorting operation in parallel with the neural engine circuit.

In one or more embodiments, the input data includes a plurality of input data elements, and the plurality of operation circuits is further configured to perform a portion of the parallel sorting operation on the plurality of input data elements in the second mode.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to a neural engine circuit of a neural processor circuit that performs a convolution operation on input data in a first mode and a parallel sorting operation on input data in a second mode. The neural engine circuit includes a plurality of operation circuits that operates with an accumulator. During the first mode, the operation circuits perform multiply-add operations of a convolution on input data and kernel data. During the second mode, the operation circuits perform a portion of a parallel sorting operation on input data.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California Other portable electronic devices, such as wearables, laptops or tablet computers, are optionally used. In some embodiments, the device is not a portable communication device, but is a desktop computer or other computing device that is not designed for portable use. In some embodiments, the disclosed electronic device may include a touch-sensitive surface (e.g., a touch screen display and/or a touchpad). An example electronic device described below in conjunction with Figure (FIG.) 1 (e.g., device 100) may include a touch-sensitive surface for receiving user input. The electronic device may also include one or more other physical user-interface devices, such as a physical keyboard, a mouse and/or a joystick.

Figure 1:
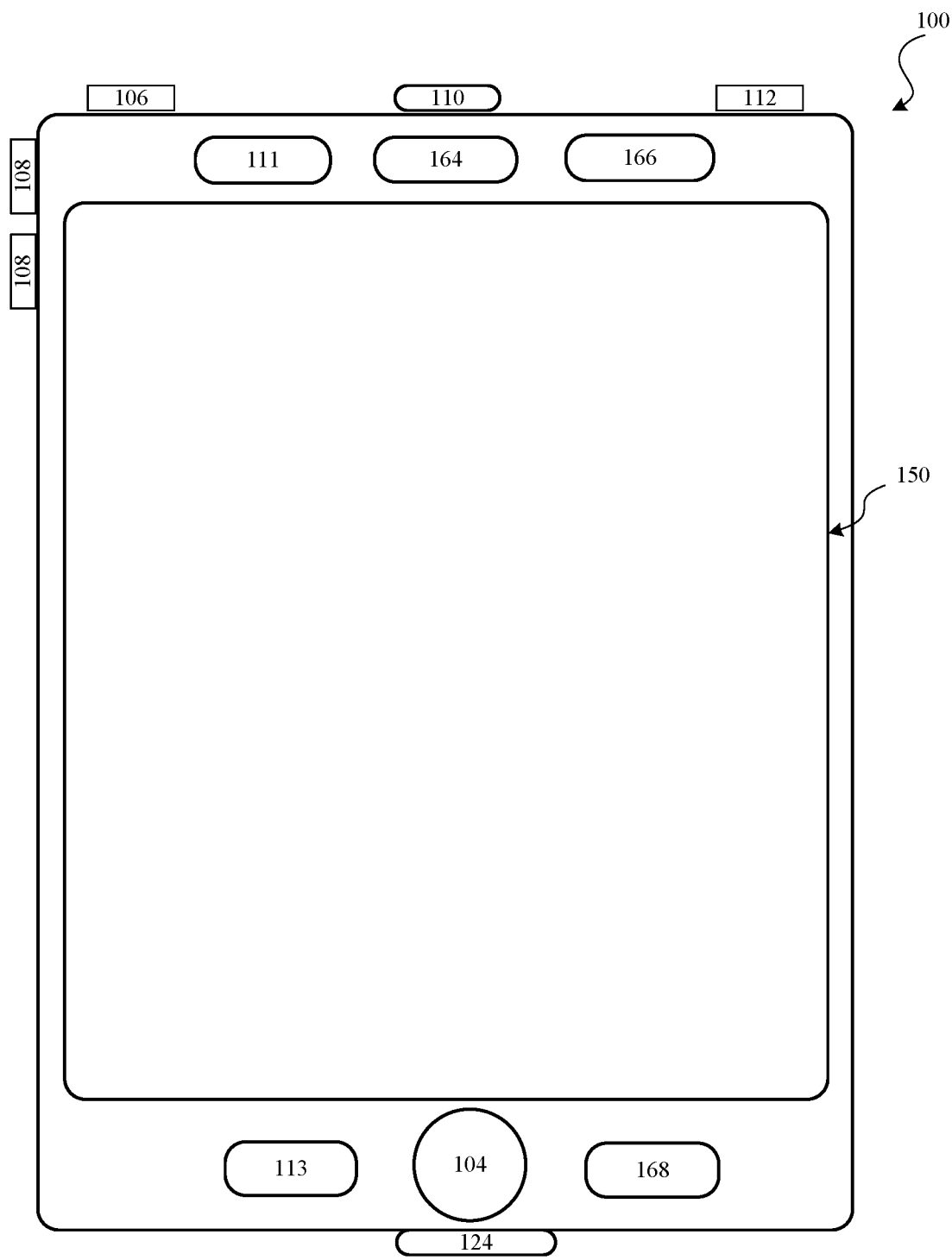
FIG. 1 is a high-level diagram of an electronic device, according to one embodiment.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, headset jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors for facial recognition that is performed by one or more machine learning models stored in device 100. Device 100 may include components not shown in FIG. 1 such as an ambient light sensor, a dot projector and a flood illuminator that is to support facial recognition.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application-specific integrated circuits (ASICs).

Figure 2:
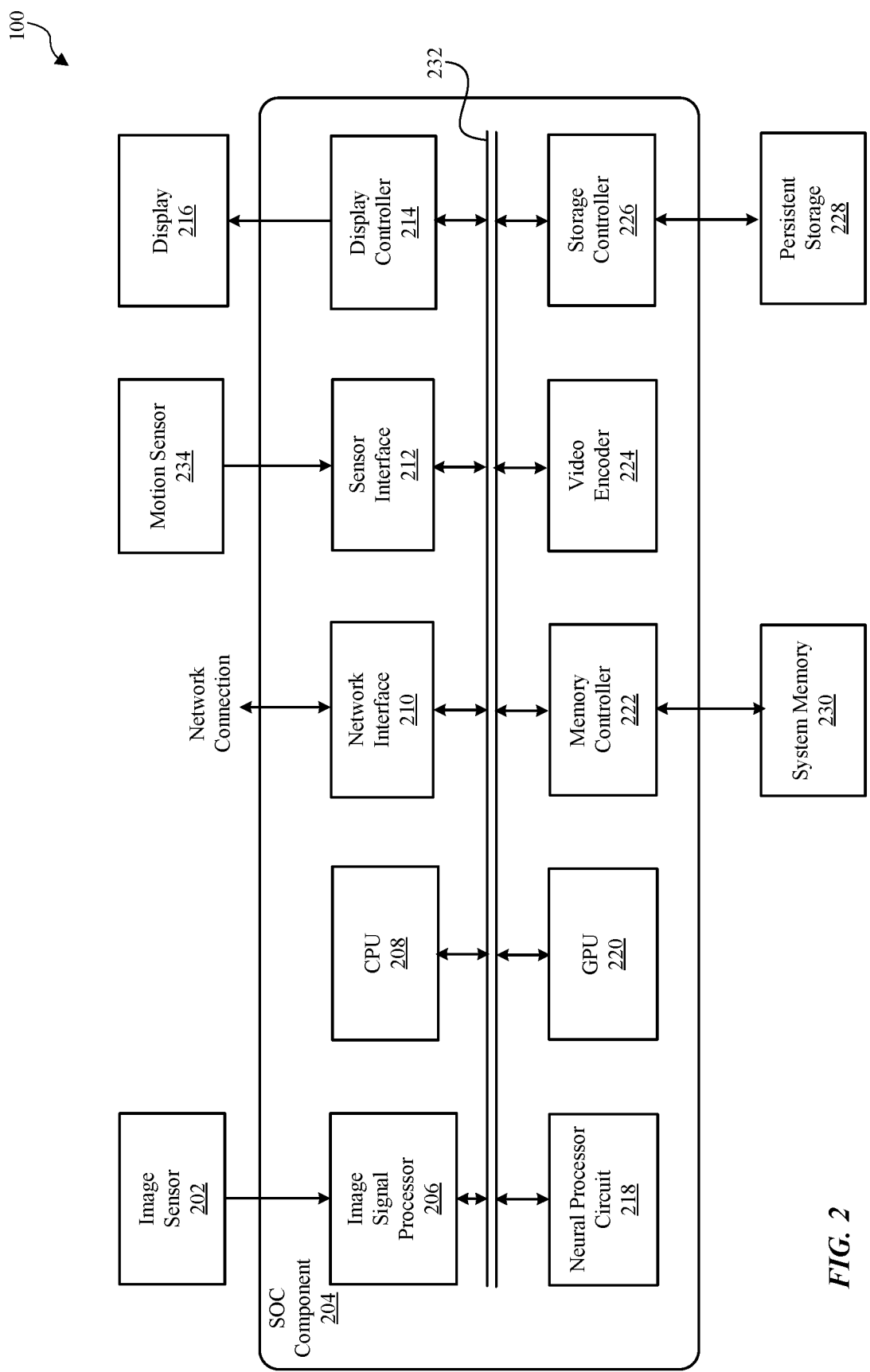
FIG. 2 is a block diagram illustrating components in the electronic device, according to one embodiment.

FIG. 2 is a block diagram illustrating components in device 100, according to one embodiment. Device 100 may perform various operations including implementing one or more machine learning models. For this and other purposes, device 100 may include, among other components, image sensors 202, a system-on-a chip (SOC) component 204, a system memory 230, a persistent storage (e.g., flash memory) 228, a motion sensor 234, and a display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

An image sensor 202 is a component for capturing image data and may be embodied, for example, as a complementary metal-oxide-semiconductor (CMOS) active-pixel sensor a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color kernel array (CFA) pattern.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light-emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof.

Persistent storage 228 is a component for storing data in a non-volatile manner. Persistent storage 228 retains data even when power is not available. Persistent storage 228 may be embodied as read-only memory (ROM), flash memory or other non-volatile random access memory devices. Persistent storage 228 stores an operating system of device 100 and various software applications. Persistent storage 228 may also store one or more machine learning models, such as regression models, random forest models, support vector machines (SVMs) such as kernel SVMs, and artificial neural networks (ANNs) such as convolutional network networks (CNNs), recurrent network networks (RNNs), autoencoders, and long short term memory (LSTM). A machine learning model may be an independent model that works with the neural processor circuit 218 and various software applications or sensors of device 100. A machine learning model may also be part of a software application. The machine learning models may perform various tasks such as facial recognition, image classification, object, concept, and information classification, speech recognition, machine translation, voice recognition, voice command recognition, text recognition, text and context analysis, other natural language processing, predictions, and recommendations.

Various machine learning models stored in device 100 may be fully trained, untrained, or partially trained to allow device 100 to reinforce or continue to train the machine learning models as device 100 is used. Operations of the machine learning models include various computation used in training the models and determining results in runtime using the models. For example, in one case, device 100 captures facial images of the user and uses the images to continue to improve a machine learning model that is used to lock or unlock the device 100.

SOC component 204 is embodied as one or more integrated circuit (IC) chips and performs various data processing processes. SOC component 204 may include, among other subcomponents, image signal processor (ISP) 206, a central processor unit (CPU) 208, a network interface 210, sensor interface 212, display controller 214, neural processor circuit 218, graphics processor unit (GPU) 220, memory controller 222, video encoder 224, storage controller 226, and bus 232 connecting these subcomponents. SOC component 204 may include more or fewer subcomponents than those shown in FIG. 2.

ISP 206 is a circuit that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

Neural processor circuit 218 is a circuit that performs various machine learning operations based on computation including multiplication, addition, comparison, and accumulation. Such computation may be arranged to perform, for example, various types of tensor multiplications such as tensor product and convolution of input data and kernel data. Neural processor circuit 218 is a configurable circuit that performs these operations in a fast and power-efficient manner while relieving CPU 208 of resource-intensive operations associated with neural network operations. Neural processor circuit 218 may receive the input data from sensor interface 212, the image signal processor 206, persistent storage 228, system memory 230 or other sources such as network interface 210 or GPU 220. The output of neural processor circuit 218 may be provided to various components of device 100 such as image signal processor 206, system memory 230 or CPU 208 for various operations. The structure and operation of neural processor circuit 218 are described below in detail with reference to FIG. 3.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on neural processor circuit 218, ISP 206, CPU 208 or GPU 220. Such software components may be stored in system memory 230, persistent storage 228 or another device communicating with device 100 via network interface 210.

Example Neural Processor Circuit

Neural processor circuit 218 is a programmable circuit that performs machine learning operations on the input data of neural processor circuit 218. Machine learning operations may include different computations for training of a machine learning model and for performing inference or prediction based on the trained machine learning model.

Taking an example of a CNN as the machine learning model, training of the CNN may include forward propagation and backpropagation. A neural network may include an input layer, an output layer, and one or more intermediate layers that may be referred to as hidden layers. Each layer may include one or more nodes, which may be fully or partially connected to other nodes in adjacent layers. In forward propagation, the neural network performs computation in the forward direction based on outputs of a preceding layer. The operation of a node may be defined by one or more functions. The functions that define the operation of a node may include various computation operation such as convolution of data with one or more kernels, parallel sorting of data, pooling of layers, tensor multiplication, etc. The functions may also include an activation function that adjusts the weight of the output of the node. Nodes in different layers may be associated with different functions. For example, a CNN may include one or more convolutional layers that are mixed with pooling layers and are followed by one or more fully connected layers.

Each of the functions, including kernels, in a machine learning model may be associated with different coefficients that are adjustable during training. In addition, some of the nodes in a neural network each may also be associated with an activation function that decides the weight of the output of the node in a forward propagation. Common activation functions may include step functions, linear functions, sigmoid functions, hyperbolic tangent functions (tan h), and rectified linear unit functions (ReLU). After a batch of data of training samples passes through a neural network in the forward propagation, the results may be compared to the training labels of the training samples to compute the network's loss function, which represents the performance of the network. In turn, the neural network performs backpropagation by using coordinate descent such as stochastic coordinate descent (SGD) to adjust the coefficients in various functions to improve the value of the loss function.

In training, device 100 may use neural processor circuit 218 to perform all or some of the operations in the forward propagation and backpropagation. Multiple rounds of forward propagation and backpropagation may be performed by neural processor circuit 218, solely or in coordination with other processors such as CPU 208, GPU 220, and ISP 206. Training may be completed when the loss function no longer improves (e.g., the machine learning model has converged) or after a predetermined number of rounds for a particular set of training samples. As device 100 is used, device 100 may continue to collect additional training samples for the neural network.

For prediction or inference, device 100 may receive one or more input samples. Neural processor circuit 218 may take the input samples to perform forward propagation to determine one or more results. The input samples may be images, speeches, text files, sensor data, or other data.

Data and functions (e.g., input data, kernels, functions, layers outputs, gradient data) in machine learning may be saved and represented by one or more tensors. Common operations related to training and runtime of a machine learning model may include tensor product, tensor transpose, tensor elementwise operation, convolution, sorting, application of an activation function, automatic differentiation to determine gradient, statistics and aggregation of values in tensors (e.g., average, variance, standard deviation), tensor rank and size manipulation, etc.

While the training and runtime of a neural network is discussed as an example, the neural processor circuit 218 may also be used for the operations of other types of machine learning models, such as a kernel SVM.

Figure 3:
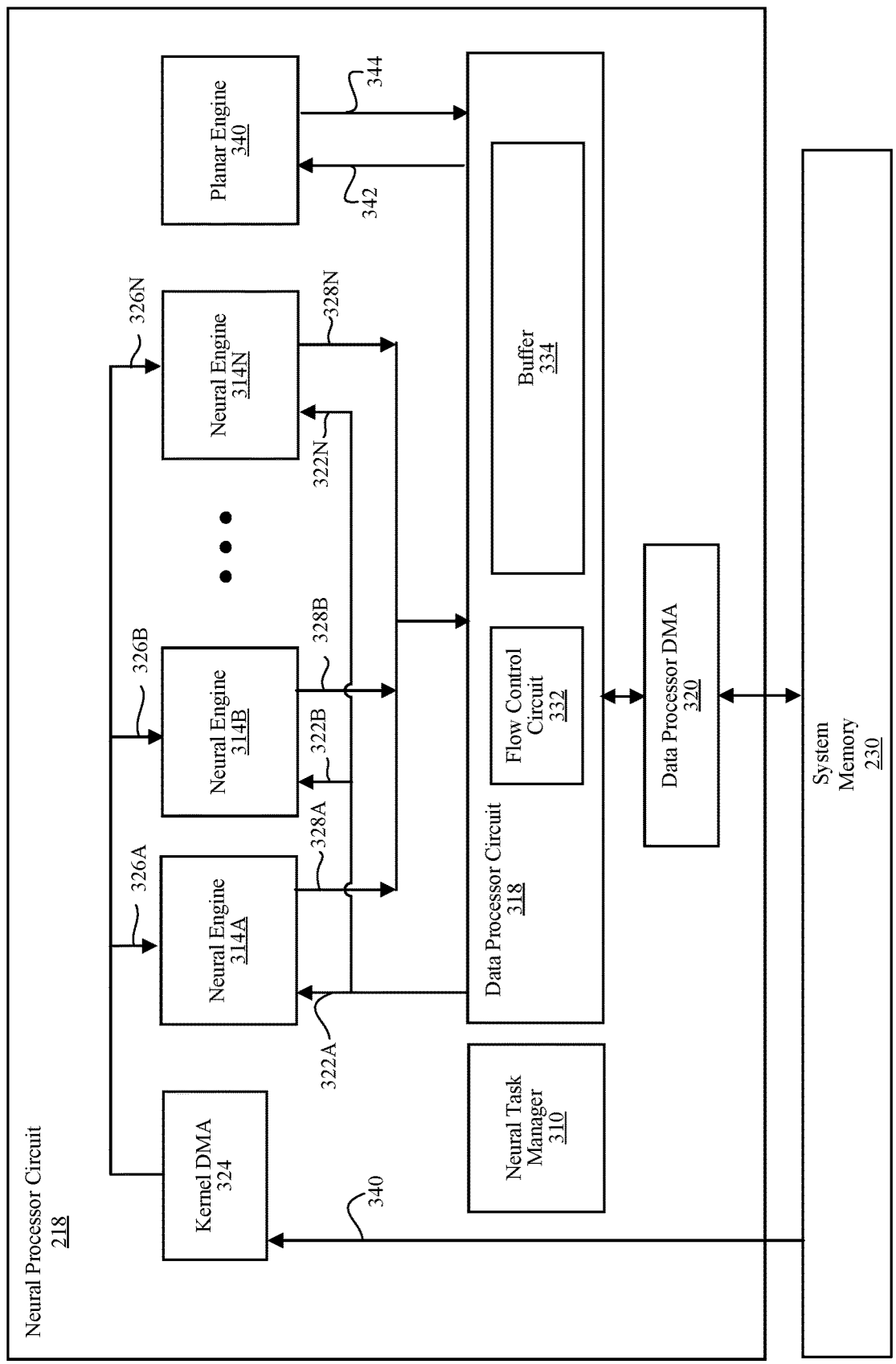
FIG. 3 is a block diagram illustrating a neural processor circuit, according to one embodiment.

Referring to FIG. 3, an example neural processor circuit 218 may include, among other components, neural task manager 310, a plurality of neural engines 314A through 314N (hereinafter collectively referred as "neural engines 314" and individually also referred to as "neural engine 314"), kernel direct memory access (DMA) 324, data processor circuit 318, data processor DMA 320, and planar engine 340. Neural processor circuit 218 may include fewer or additional components not illustrated in FIG. 3.

Each of neural engines 314 performs computing operations for machine learning in parallel. Depending on the load of operation, the entire set of neural engines 314 may be operating or only a subset of the neural engines 314 may be operating while the remaining neural engines 314 are placed in a power-saving mode to conserve power. Each of neural engines 314 includes components for storing one or more kernels, for performing multiply-accumulate operations, for performing parallel sorting operations, and for post-processing to generate an output data 328, as described below in detail with reference to FIGS. 4A and 4B. Neural engines 314 may specialize in performing computation heavy operations such as convolution operations and tensor product operations. Convolution operations may include different kinds of convolutions, such as cross-channel convolutions (a convolution that accumulates values from different channels), channel-wise convolutions, and transposed convolutions.

Planar engine 340 may specialize in performing simpler computing operations whose speed may primarily depend on the input and output (I/O) speed of the data transmission instead of the computation speed within planar engine 340. Those computing operations may be referred to as I/O bound computations. In contrast, neural engines 314 may focus on complex computation whose speed may primarily depend on the computation speed within each neural engine 314. For example, planar engine 340 is efficient at performing operations within a single channel while neural engines 314 are efficient at performing operations across multiple channels that may involve heavy accumulation of data. The use of neural engine 314 to compute I/O bound computations may not be efficient in terms of both speed and power consumption. In one embodiment, input data may be a tensor whose rank is larger than three (e.g., having three or more dimensions). A set of dimensions (two or more) in the tensor may be referred to as a plane while another dimension may be referred to as a channel. Neural engines 314 may convolve data of a plane in the tensor with a kernel and accumulate results of the convolution of different planes across different channels. On the other hand, planar engine 340 may specialize in operations within the plane.

The circuitry of planar engine 340 may be programmed for operation in one of multiple modes, including a pooling mode, an elementwise mode, and a reduction mode. In the pooling mode, planar engine 340 reduce a spatial size of input data. In the elementwise mode, planar engine 340 generates an output that is derived from elementwise operations of one or more inputs. In the reduction mode, planar engine 340 reduces the rank of a tensor. For example, a rank 5 tensor may be reduced to a rank 2 tensor, or a rank 3 tensor may be reduced to a rank 0 tensor (e.g., a scalar).

Neural task manager 310 manages the overall operation of neural processor circuit 218. Neural task manager 310 may receive a task list from a compiler executed by CPU 208, store tasks in its task queues, choose a task to perform, and send task commands to other components of the neural processor circuit 218 for performing the chosen task. Data may be associated with a task command that indicates the types of operations to be performed on the data. Data of the neural processor circuit 218 includes input data that is transmitted from another source such as system memory 230, and data generated by the neural processor circuit 218 in a previous operation cycle. Each dataset may be associated with a task command that specifies the type of operations to be performed on the data. Neural task manager 310 may also perform switching of tasks on detection of events such as receiving instructions from CPU 208. In one or more embodiments, neural task manager 310 sends rasterizer information to the components of neural processor circuit 218 to enable each of the components to track, retrieve or process appropriate segments of the input data and kernel data. For example, neural task manager 310 may include registers that stores the information regarding the size and rank of a dataset for processing by the neural processor circuit 218. Although neural task manager 310 is illustrated in FIG. 3 as part of neural processor circuit 218, neural task manager 310 may be a component outside the neural processor circuit 218.

Kernel DMA 324 is a read circuit that fetches kernel data from a source (e.g., system memory 230) and sends kernel data 326A through 326N to each of the neural engines 314. Kernel data represents information from which kernel elements can be extracted. In one embodiment, the kernel data may be in a compressed format which is decompressed at each of neural engines 314. Although kernel data provided to each of neural engines 314 may be the same in some instances, the kernel data provided to each of neural engines 314 is different in most instances. In one embodiment, the direct memory access nature of kernel DMA 324 may allow kernel DMA 324 to fetch and write data directly from the source without the involvement of CPU 208.

Data processor circuit 318 manages data traffic and task performance of neural processor circuit 218. Data processor circuit 318 may include a flow control circuit 332 and a buffer 334. Buffer 334 is temporary storage for storing data associated with operations of neural processor circuit 218 and planar engine 340, such as input data that is transmitted from system memory 230 (e.g., data from a machine learning model) and other data that is generated within neural processor circuit 218 or planar engine 340. The data stored in data processor circuit 318 may include different subsets that are sent to various downstream components, such as neural engines 314 and planar engine 340.

In one embodiment, buffer 334 is embodied as a non-transitory memory that can be accessed by neural engines 314 and planar engine 340. Buffer 334 may store input data 322A through 322N for feeding to corresponding neural engines 314A through 314N or planar engine 340, as well as output data 328A through 328N from each of neural engines 314A through 314N or planar engine 340 for feeding back into one or more neural engines 314 or planar engine 340, or sending to a target circuit (e.g., system memory 230). Buffer 334 may also store input data 342 and output data 344 of planar engine 340 and allow the exchange of data between neural engine 314 and planar engine 340. For example, one or more output data 328A through 328N of neural engines 314 are used as the input 342 to planar engine 340. Likewise, the output 344 of planar engine 340 may be used as the input data 322A through 322N of neural engines 314. The inputs of neural engines 314 or planar engine 340 may be any data stored in buffer 334. For example, in various operating cycles, the source datasets from which one of the engines fetches as inputs may be different. The input of an engine may be an output of the same engine in previous cycles, outputs of different engines, or any other suitable source datasets stored in buffer 334. Also, a dataset in buffer 334 may be divided and sent to different engines for different operations in the next operating cycle. Two datasets in buffer 334 may also be joined for the next operation.

Flow control circuit 332 of data processor circuit 318 may control the exchange of data between neural engines 314 and planar engine 340. The operations of data processor circuit 318 and other components of neural processor circuit 218 are coordinated so that the input data and intermediate data stored in data processor circuit 318 may be reused across multiple operations at neural engines 314 and planar engine 340, thereby reducing data transfer to and from system memory 230. Flow control circuit 332 may perform one or more of the following operations: (i) monitor the size and rank of data (e.g. data may be one or more tensors) that are being processed by neural engines 314 and planar engine 340, (ii) determine which subsets of data are transmitted to neural engines 314 or to planar engine 340 based on the task commands associated with different subsets of data, (iii) determine the manner in which data is transmitted to neural engines 314 and planar engine 340 (e.g., the data processor circuit 318 may operate in a broadcast mode where the same data is fed to multiple input channels of neural engines 314 so that multiple or all neural engines 314 receive the same data or in a unicast mode where different neural engines 314 receives different data), and (iv) transmit a configuration command to the planar engine 340 to direct planar engine 340 to program itself for operating in one of multiple operation modes.

The data of neural processor circuit 218 stored in buffer 334 may be part of, among others, image data, histogram of oriented gradients (HOG) data, audio data, metadata, output data 328 of a previous cycle of a neural engine 314, and other processed data received from other components of the SOC component 204.

Data processor DMA 320 includes a read circuit that receives a segment of the input data from a source (e.g., system memory 230) for storing in buffer 334, and a write circuit that forwards data from buffer 334 to a target component (e.g., system memory). In one embodiment, the direct memory access nature of data processor DMA 320 may allow data processor DMA 320 to fetch and write data directly from a source (e.g., system memory 230) without the involvement of CPU 208. Buffer 334 may be a direct memory access buffer that stores data of a machine learning model of device 100 without involvement of CPU 208.

Example Neural Engine Architecture

Figure 4A:
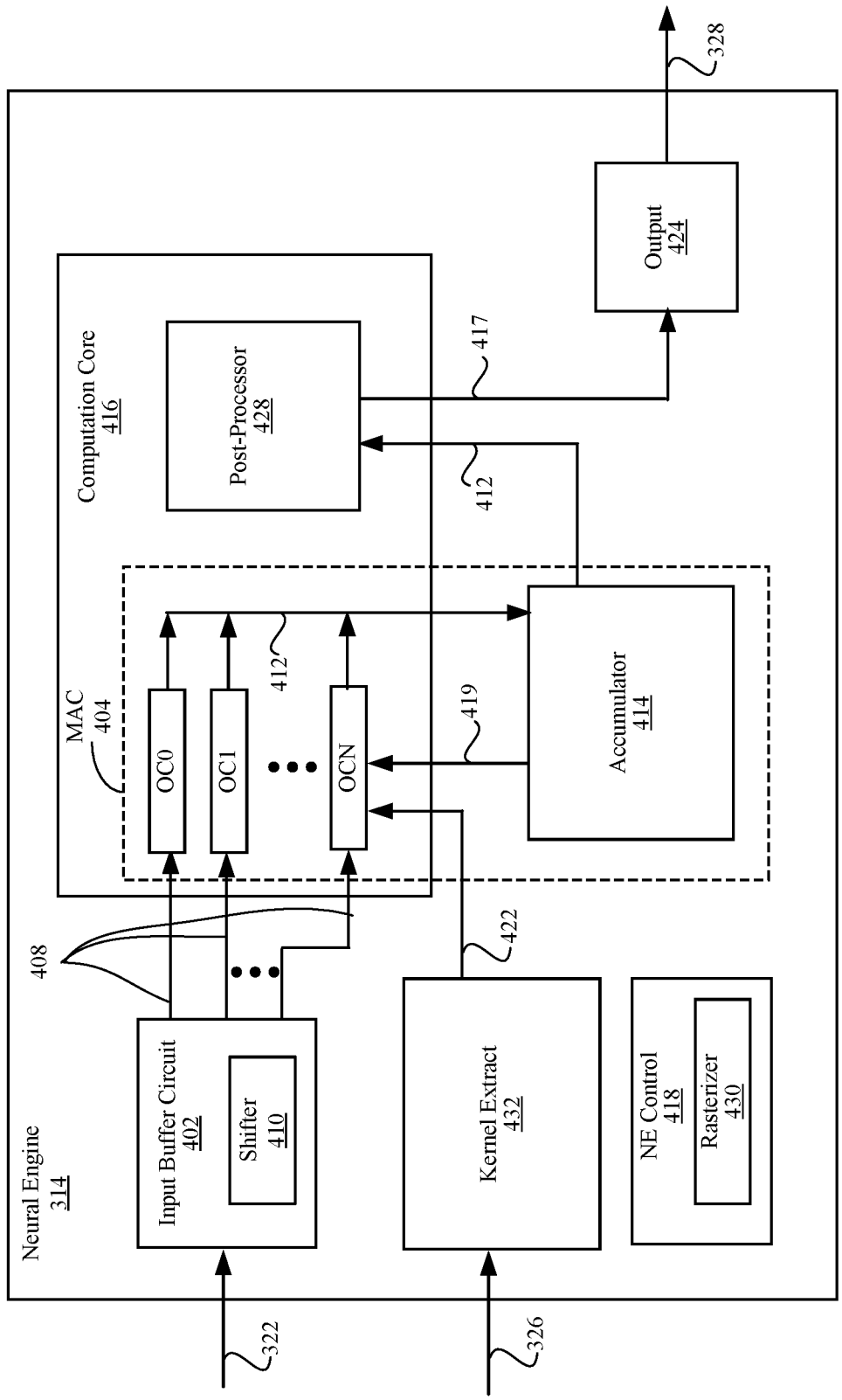
FIG. 4A is a block diagram of neural engine, according to one embodiment.

FIG. 4A is a block diagram of neural engine 314, according to one embodiment. Specifically, FIG. 4A illustrates neural engine 314 perform operations including operations to facilitate machine learning such as convolution, tensor product, and other operations that may involve heavy computation in the first mode. For this purpose, neural engine 314 receives input data 322, performs multiply-accumulate operations (e.g., convolution operations) on input data 322 based on stored kernel data, performs further post-processing operations on the result of the multiply-accumulate operations, and generates output data 328. Input data 322 and/or output data 328 of neural engine 314 may be of a single channel or span across multiple channels.

Neural engine 314 may include, among other components, input buffer circuit 402, computation core 416, neural engine (NE) control 418, kernel extract circuit 432, accumulator 414, and output circuit 424. Neural engine 314 may include fewer components than what is illustrated in FIG. 4A or include further components not illustrated in FIG. 4A.

In the first mode, input buffer circuit 402 stores a subset of the data of neural processor circuit 218 as the subset of data is received from a source. The source may be data processor circuit 318, planar engine 340, or another suitable component. Input buffer circuit 402 sends an appropriate segment 408 of data for a current task or process loop to computation core 416 for processing. Input buffer circuit 402 may include a shifter 410 that shifts read locations of input buffer circuit 402 to change segment 408 of data sent to computation core 416. By changing segments of input data 322 provided to computation core 416 via shifting, neural engine 314 can perform multiply-accumulate for different segments of input data 322 based on a fewer number of read operations. In one or more embodiments, the data of neural processor circuit 218 includes data of different convolution groups and/or input channels.

In the first mode, kernel extract circuit 432 receives kernel data 326 from kernel DMA 324 and extracts kernel coefficients 422. In one embodiment, kernel extract circuit 432 references a lookup table (LUT) and uses a mask to reconstruct a kernel from compressed kernel data 326 based on the LUT. The mask indicates locations in the reconstructed kernel to be padded with zero and remaining locations to be filled with numbers. Kernel coefficients 422 of the reconstructed kernel are sent to computation core 416 to populate registers in operation circuits of computation core 416. In other embodiments, kernel extract circuit 432 receives kernel data 326 in an uncompressed format and the kernel coefficients 422 are determined without referencing a LUT or using a mask.

In the first mode, computation core 416 performs computation operations. For this purpose, computation core 416 may include operation circuits OC0 through OCN and a post-processor 428. Each of operation circuits OC0 through OCN may store an input value in the segment 408 of the input data and a corresponding kernel coefficient in kernel coefficients 422. The input value and the corresponding kernel coefficient are multiplied in each of operation circuits OC0 through OCN to generate a processed value 412.

In the first mode, accumulator 414 receives and stores processed values 412 as a first result from operation circuits. The processed values stored in accumulator 414 may be sent back as feedback information 419 for further multiply and add operations at operation circuits or sent to post-processor 428 for post-processing. In the first mode, accumulator 414 in combination with operation circuits form a multiply-accumulator (MAC) 404. In one or more embodiments, accumulator 414 may have subunits where each subunit sends data to different components of neural engine 314. For example, during a processing cycle, data stored in a first subunit of accumulator 414 is sent to the MAC 404 while data stored in a second subunit of accumulator 414 is sent to post-processor 428.

In the first mode, post-processor 428 performs further processing of values 412 received from accumulator 414. Post-processor 428 may perform operations including, but not limited to, applying linear functions (e.g., Rectified Linear Unit (ReLU)), normalized cross-correlation (NCC), merging the results of performing neural operations on 8-bit data into 16-bit data, and local response normalization (LRN). The result of such operations is output from post-processor 428 as processed values 417 to output circuit 424. In some embodiments, the processing at the post-processor 428 is bypassed. For example, the data in accumulator 414 may be sent directly to output circuit 424 for access by other components of neural processor circuit 218.

NE control 418 controls operations of other components of neural engine 314 based on the operation modes and parameters of neural processor circuit 218. Depending on different modes of operation (e.g., first mode or second mode), different convolution modes of operation (e.g., group convolution mode or non-group convolution mode), or parameters (e.g., the number of input channels and the number of output channels), neural engine 314 may operate on different input data in different sequences, return different values from accumulator 414 to operation circuits, and perform different types of post-processing operations at post-processor 428. To configure components of neural engine 314 to operate in a desired manner, the NE control 418 sends task commands that may be included in information 419 to components of neural engine 314. NE control 418 may include a rasterizer 430 that tracks the current task or process loop being processed at neural engine 314.

In the first mode, rasterizer 430 may perform the operations associated with dividing the input data into smaller units (segments) and regulating the processing of the smaller units through the operation circuits and accumulator 414. Rasterizer 430 keeps track of sizes and ranks of segments of the input/output data (e.g., groups, work units, input channels, output channels) and instructs the components of a neural processor circuit 218 for proper handling of the segments of the input data. For example, rasterizer 430 operates shifters 410 in input buffer circuits 402 to forward correct segments 408 of input data 322 to MAC 404 and send the finished output data 328 to data buffer 334. Other components of neural processor circuit 218 (e.g., kernel DMA 324, buffer DMA 320, data buffer 334, planar engine 340) may also have their corresponding rasterizers to monitor the division of input data and the parallel computation of various segments of input data 322 in different components.

In the first mode, output circuit 424 receives processed values 417 from post-processor 428 and interfaces with data processor circuit 318 to store processed values 417 in data processor circuit 318. For this purpose, output circuit 424 may send out as output data 328 in a sequence or a format that is different from the sequence or format in which the processed values 417 are processed in post-processor 428.

The components in neural engine 314 may be configured during a configuration period by NE control 418 and neural task manager 310. For this purpose, neural task manager 310 sends configuration information to neural engine 314 during the configuration period. The configurable parameters and modes may include, but are not limited to, mapping between input data elements and kernel elements, the number of input channels, the number of output channels, performing of output strides, and enabling/selection of post-processing operations at post-processor 428.

Figure 4B:
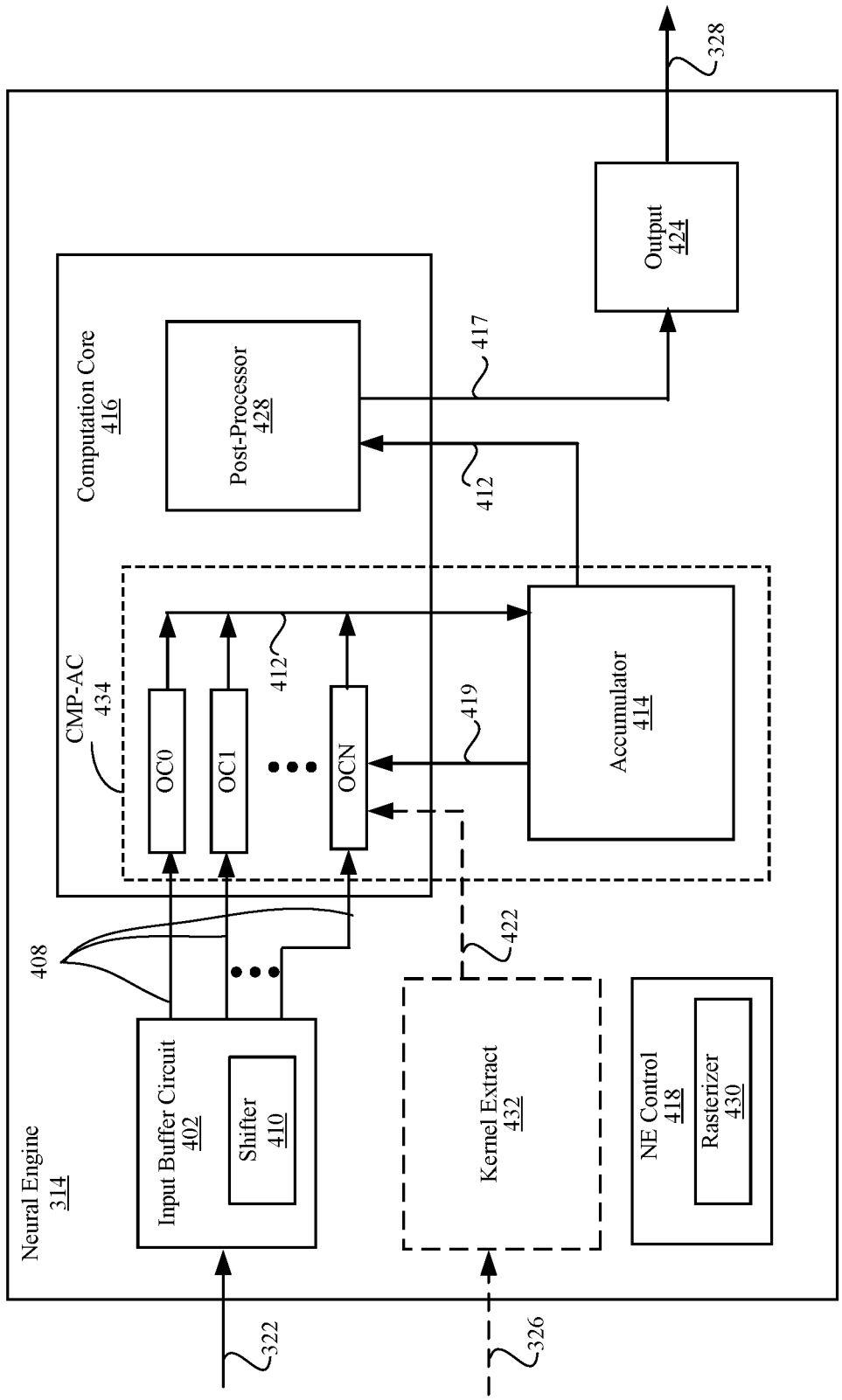
FIG. 4B is a block diagram of neural engine illustrating operations in a second mode, according to one embodiment.

FIG. 4B is a block diagram of neural engine 314 illustrating operations in a second mode, according to one embodiment. In the second mode, neural engine 314 performs parallel sorting operations (e.g., bitonic sorting, top-k bitonic sorting, counting sort, radix sort, Batcher odd-even merge sort, pairwise sort, etc.). For this purpose, neural engine 314 receives input data 322, performs a portion of a parallel sorting operation (e.g., a comparison operation) on input data 322, performs further post-processing operations on the result of the parallel sorting operation, and generates output data 328.

In the second mode, input buffer circuit 402 stores a subset of the data of neural processor circuit 218 as the subset of data is received from a source (e.g., data processor circuit 318, planar engine 340, or another suitable component). Input buffer circuit 402 sends an appropriate segment 408 of data for a current task or process loop to computation core 416 for processing. For example, segment 408 of data may include a single vector or a plurality of vectors. Input buffer circuit 402 may include a shifter 410 that shifts read locations of input buffer circuit 402 to change segment 408 of data sent to computation core 416. For example, at a first time, input buffer circuit 402 may send a first vector to computation core 416 and, at a second time, input buffer circuit 402 may send a second vector to computation core 416. By changing segments of input data 322 provided to computation core 416 via shifting, neural engine 314 can perform various portions of a parallel sorting operation for different segments of input data 322 based on a fewer number of read operations to data processor circuit 318 or system memory 230.

In the second mode, kernel extract circuit 432 is disabled by the NE control 418 while operation circuits OC0 through OCN perform sorting operations on the segment 408 of the input data. Specifically, each of operations circuits OC0 through OCN compares an input value to a previous input value to generate a processed value 412. In some embodiments, processed value 412 may be a maximum value or a minimum value. In some embodiments, processed value 412 may include a maximum value and metadata corresponding to the maximum value (e.g., an index indicating value is greater) or a minimum value and metadata corresponding to the minimum value (e.g., an index indicating value is lesser).

In the second mode, accumulator 414 receives and stores a result of comparison operation as the second result from operation circuits. The processed values 412 stored in accumulator 414 may be sent back as feedback information 419 for further comparison operations (e.g., for performing a subsequent portion of the parallel sorting operation) at operation circuits OC0 through OCN or sent to post-processor 428 for post-processing. In the second mode, accumulator 414 in combination with operation circuits OC0 through OCN form a comparator-accumulator (CMP-AC) 434. In one or more embodiments, accumulator 414 may have subunits where each subunit sends data to different components of neural engine 314. For example, during a processing cycle, data stored in a first subunit of accumulator 414 is sent to CMP-AC 434 while data stored in a second subunit of accumulator 414 is sent to post-processor 428.

In the second mode, post-processor 428, NE control 418 and output circuit 424 may perform substantially the same operations as in the first mode described in FIG. 4A. Rasterizer 430, in the second mode, also performs operations similar to what is performed during the first mode except that it manages and tracks dividing of the input data into smaller units (segments) for sorting operations through CMP-AC 434 and accumulator 414.

Example Operation Circuit and Accumulator Circuit Diagram

Figure 5:
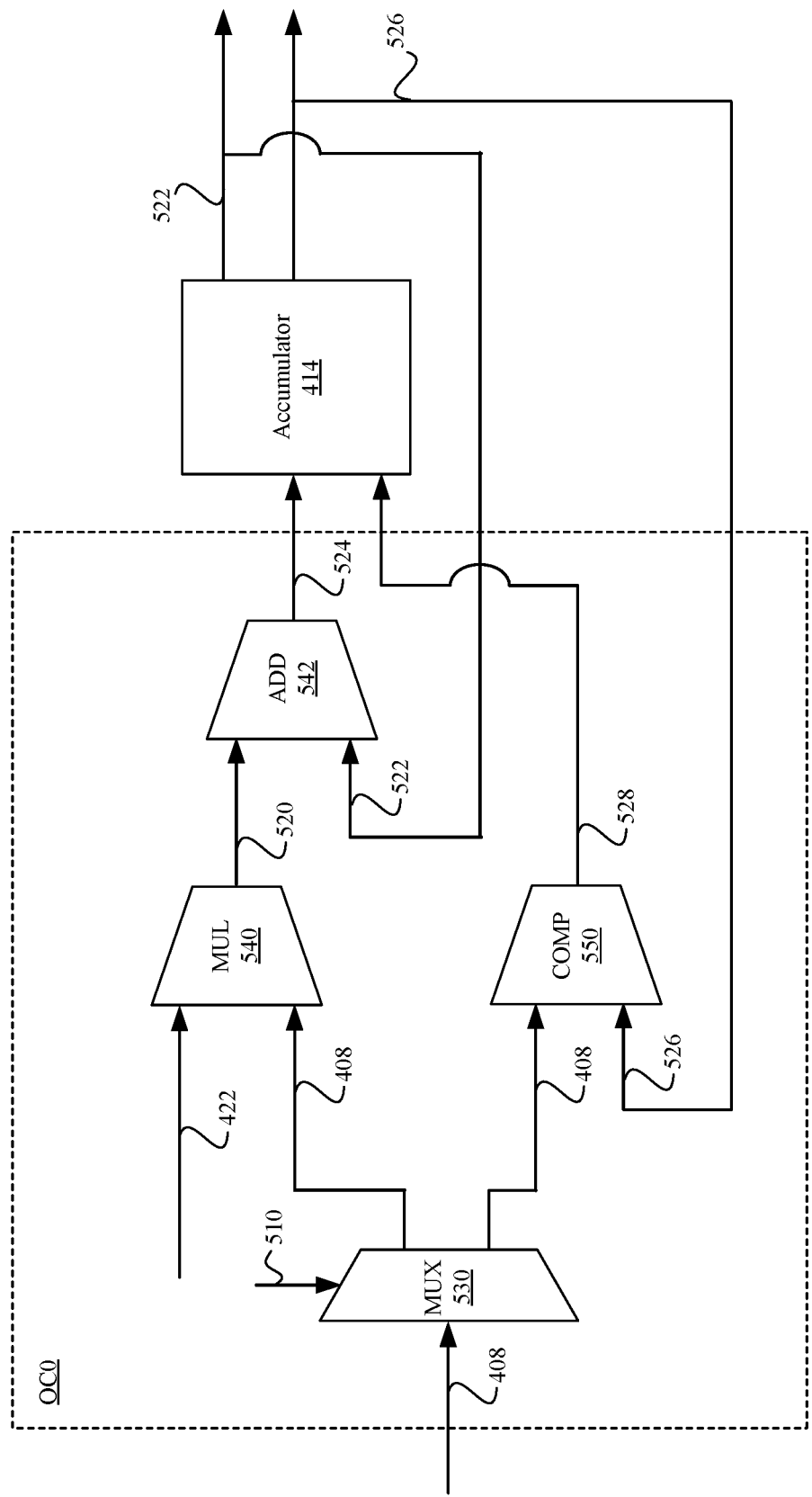
FIG. 5 is a circuit diagram of operation circuit and accumulator circuit of a neural engine, according to one embodiment.

FIG. 5 is a circuit diagram of operation circuit OC0 and accumulator circuit 414 of a neural engine 314, according to one embodiment. Operation circuit OC0 and accumulator circuit 414 may be programmed to perform in either the first mode or the second mode. In the first mode, operation circuit OC0 may perform multiply-add operations of a convolution on a segment 408 of data and accumulator circuit 414 may operate to receive and store first results 524 (e.g., processed values 412) of the multiply-add operations. Although only a single operation circuit OC0 is described in FIG. 5, other operation circuits OC1 through OCN may have the same structure and operate in the same manner as operation circuit OC0.

In the second mode, operation circuit OC0 may perform at least a portion of a parallel sorting operation to sort the segment 408 of data according to the size. For these purposes, operation circuit OC0 may include, among other components, a multiplexor 530, a multiplier 540, an adder 542, and a comparator circuit 550. Operation circuit OC0 may include fewer components or further components not illustrated in FIG. 5. For example, operation circuit OC0 may not include comparator circuit 550 and adder 542 may be utilized as a subtractor in the second mode. Each component in operation circuit OC0 may be embodied as a circuit or a circuit in combination with firmware or software.

During operation, operation circuit OC0 receives a segment 408 of data as input at multiplexor 530. Select line 510 controls output of the multiplexor 530. In the first mode, a control signal sent over select line 510 may instruct multiplexor 530 to output segment 408 of data to multiplier 540. In the second mode, the control signal sent over select line 510 may instruct multiplexor 530 to output segment 408 of data to comparator circuit 550. In some embodiments, the control signal is set by neural task manager 310 and stored in a register of neural engine 314.

In the first mode, multiplier 540 multiplies segment 408 of data with a corresponding kernel coefficient of kernel coefficients 422 that results in product value 520 corresponding to a multiplied value of the kernel coefficient and the data. Multiplier 540 provides product value 520 to adder 542. Accumulator 414 provides stored first result 522 (generated as a result of prior adding operation at adder 542) to adder 542 so that adder 542 adds product value 520 to the stored first result 522. After accumulated value 524 is generated by adder 542, accumulated value 524 is again sent to accumulator 414 as first result 522. Updated first result 522 can then be accumulated with another product value 520 in a next round. The process is repeated until all segment 408 of data and corresponding kernel coefficients 422 are processed. When accumulator 414 does not have a stored first result 522 to provide to adder 542 (e.g., in the first round of processing), adder 542 passes product value 520 to accumulator 414 so that the first product value 520 can be stored as an initial first result 522.

In the second mode, comparator circuit 550 receives segment 408 of data from multiplexor 530. When a first data value of segment 408 of data is received, it passes comparator circuit 550 and is stored in accumulator 414. The first data value may be tagged with an initial index for the sorting operation. In the next round, a second data value is received as segment 408 of data and is fed to comparator circuit 550. Furthermore, the first data value 526 is retrieved from accumulator 414 and fed to comparator circuit 550. Comparator circuit 550 compares the first data value 526 and the second data value, updates their tagged indices to indicate which one of the first or second data value is larger, and forwards the second data value with its tagged index as a second result 528 to accumulator 414 for storing.

Subsequently, one of the stored vector/scalar values 526 is fed to comparator circuit 550 and compared with a new data value received as the next segment 408 of data. The process of feeding one of the stored data values 526 to the comparator circuit 550 and comparing it with a new data value is repeated until comparison operations are completed. The sequence of data values to be compared may be set by rasterizer 430 and may implement a parallel sorting network, as described below in detail with reference to FIG. 7. As each round of comparison is performed, the indices tagged to each vector/scalar value is updated to reflect the order to be sorted.

In alternative embodiments, the data values are not tagged with indices. For example, the comparator circuit 550 compares the first data value 526 and the second data value and forwards the first data value 526 and the second data value in either an increasing or decreasing order as the second result 528 to accumulator 414 for storing.

In embodiments of operation circuit OC0 implemented with no comparator circuit 550 and adder 542 is utilized as a subtractor, the first data value 526 is retrieved from accumulator 414 and fed to adder 542. Adder 542 subtracts the first data value 526 and the second data value. A sign-bit of the result determines which of the first data value 526 or second data value is forwarded as a second result 528 to accumulator 414 for storing. Subsequently, one of the stored vector/scalar values 526 is fed to adder 542 and subtracted with a new data value received as the next segment 408 of data.

While operation circuit OC0 is performing its comparison operations in the second mode, one or more of the other operation circuit OC1 through OCN may perform their own comparisons in parallel.

Example Process of Operating Neural Engine Circuit

Figure 6:
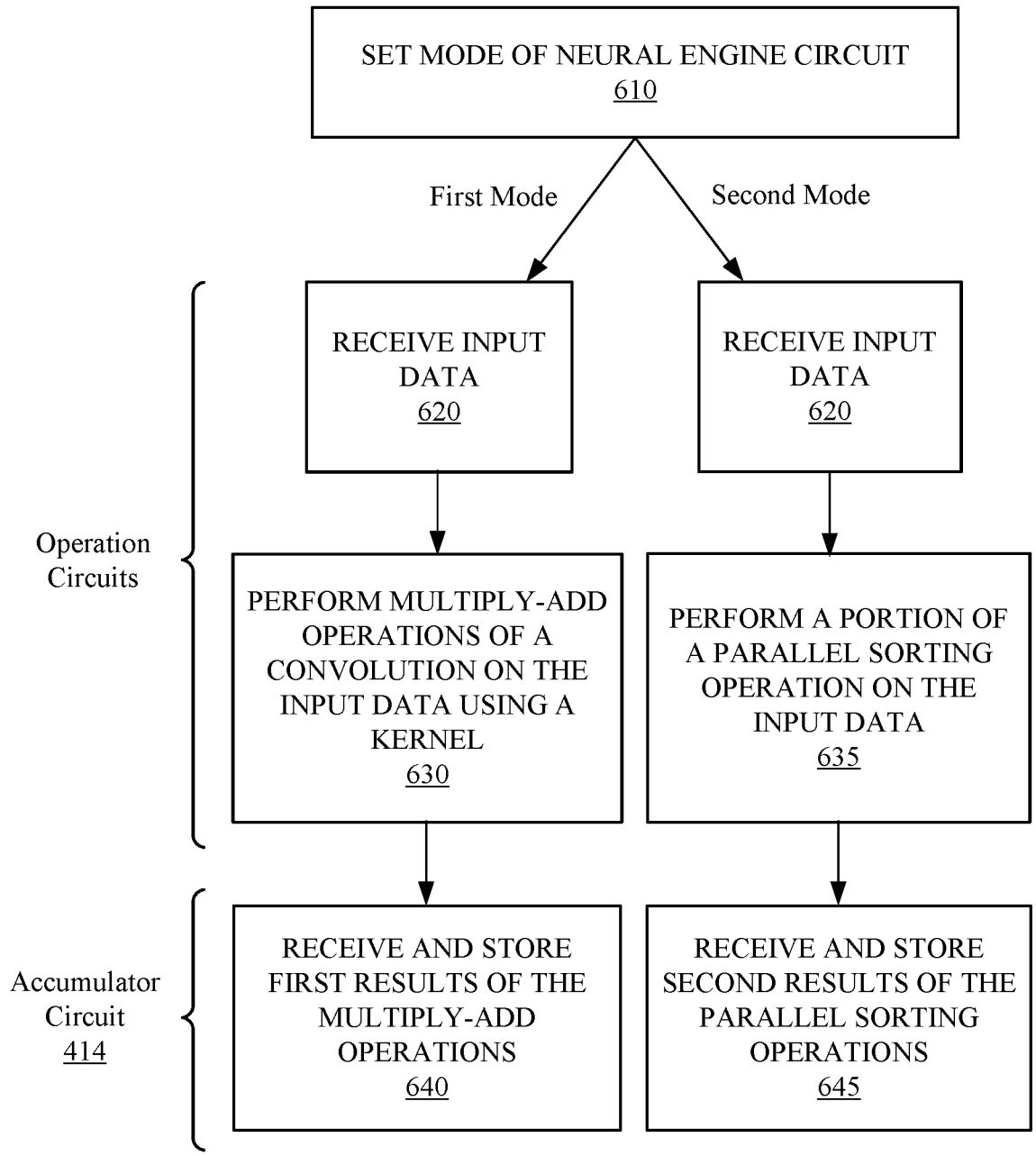
FIG. 6 is a flowchart illustrating a method of operating neural engine circuit in a first and second mode, according to one embodiment.

FIG. 6 is a flowchart illustrating a method of operating neural engine circuit 314 in a first and second mode, according to one embodiment. Neural processor circuit 218 (e.g., via neural task manager 310) sets 610 a mode of neural engine circuit 314.

When set to the first mode, the operation circuits (e.g., OC0 through OCN of MAC 404) of neural engine circuit 314 receive 620 input data (e.g., each operation circuit receives a segment 408 of data). The operation circuits perform 630 multiply-add operations of a convolution on the input data using a kernel (e.g., a kernel coefficient of the kernel coefficients 422). Accumulator 414 receives and stores 640 accumulated value as a first results of the multiply-add operations.

When set to the second mode, the plurality of operation circuits (e.g., OC0 through OCN of CMP-AC 434) of neural engine circuit 314 receive 620 input data (e.g., each operation circuit receives a segment 408 of data). The plurality of operation circuits performs 635 a portion of a parallel sorting operation on the input data. Accumulator 414 receives and stores 645 second results of the parallel sorting operations. The second results include the compared data values and tagged indices indicating the sorted order of the data values.

Embodiments of the process described above with reference to FIG. 6 are merely illustrative. Moreover, sequence of the proves may be modified or omitted.

Example Parallel Sorting Network

Figure 7:
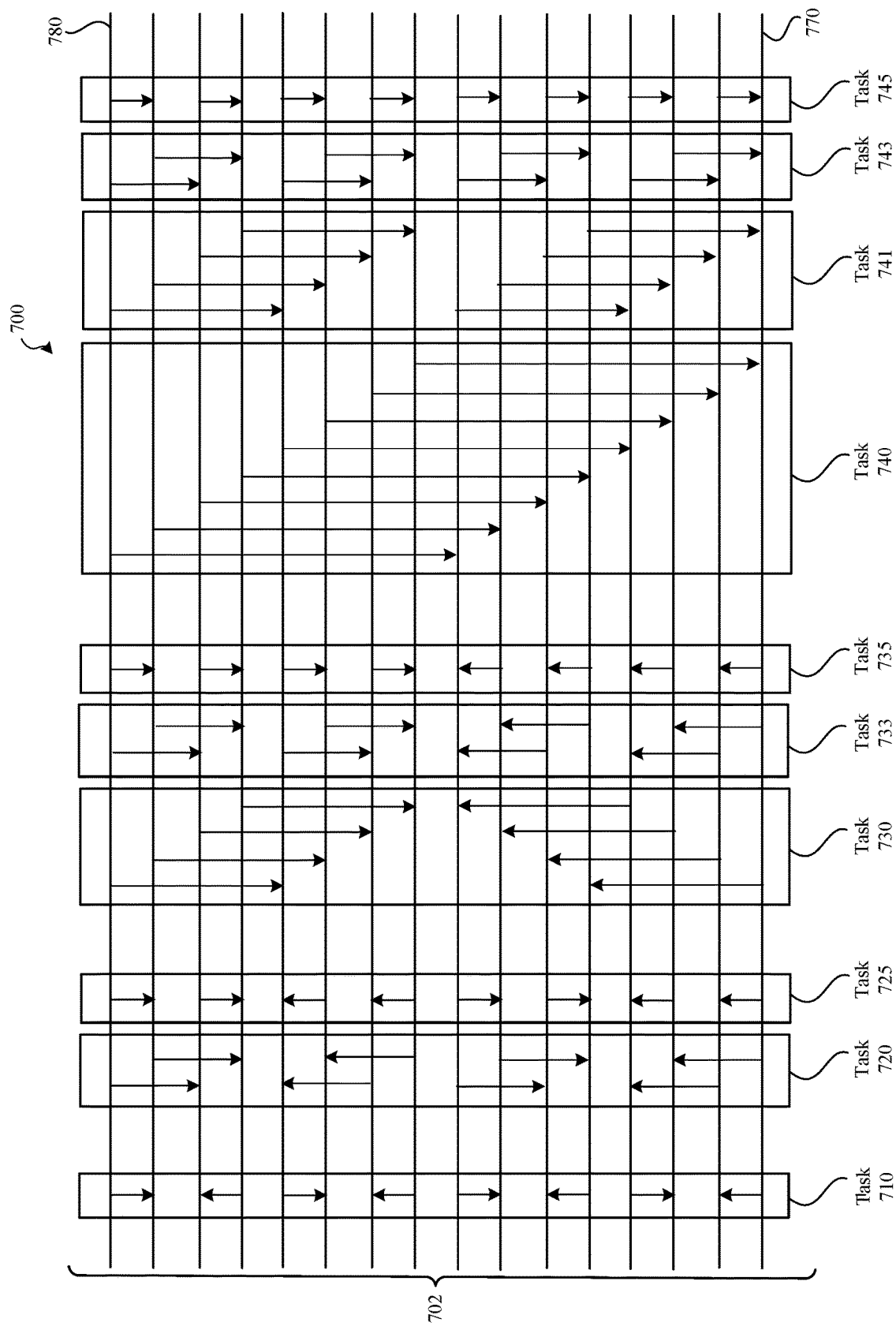
FIG. 7 is a conceptual diagram illustrating an example parallel sorting network performed at neural processor circuit, according to one embodiment.

FIG. 7 is a conceptual diagram illustrating an example parallel sorting network 700 performed at neural processor circuit 218, according to one embodiment. The parallel sorting network 700 illustrated in FIG. 7 is a bitonic sorting network that receives 16 data values 702 and simultaneously produces a maximum value 770 and a minimum value 780 of input data at the end of the sorting operation.

In the example of FIG. 7, the parallel sorting network 700 is embodied using one or more neural engine circuits 314. Multiple operation circuits (e.g., OC0 through OCN) in the one or more neural engine circuits 314 perform sorting (comparison) operations represented by arrows in FIG. 7. Task 710, task 720, task 725, task 730, task 733, task 735, task 740, task 741, task 743, and task 745 are performed in sequence to accomplish a parallel sorting operation. Each of these tasks may be performed by one or more neural engine circuits 314.

Sorting operations of task 710 may be performed in a single cycle of one neural engine circuit 314 by having 8 of its operation circuits perform the sorting operations in parallel. Alternatively, the same operation may be performed in multiple cycles by using a fewer number of operation circuits in one neural engine circuits 314. If the number of sorting operations is large, operation circuits in two or more neural engine circuits 314 may be operated in parallel.

After task 710 is finished, one or more neural engine circuits 314 are updated to perform task 720 and execute the sorting operations as defined by task 720. After tasks 720, 725, 730, 733, 735, 740, 741, 743 and 745, the indices tagged to the data values indicate the sorted order of the data values. A data value with an index indicating the highest number is output as maximum number 770, and another data value with an index indicating the lowest number is output as minimum number 780.

In alternative embodiments (not shown in FIG. 7), input data may include multiple elements (e.g., 16, 100, 256 elements, etc.). Each element may be an individual data value (e.g., individual elements in a vector), a vector, or multiple vectors that undergo sorting operations by the neural engines 314.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A neural engine circuit, comprising:
   a neural engine control circuit;
   a kernel extract circuit configured to:
      in a first mode:
         receive kernel data from a memory coupled to the neural engine circuit; and
         obtain a kernel from the kernel data; and
      in a second mode:
         receive a command from the neural engine control circuit that causes the kernel extract circuit to be disabled;
   a plurality of operation circuits configured to:
      receive input data,
      in the first mode, perform multiply-add operations of a convolution on the input data using the kernel obtained by the kernel extract circuit, and
      in the second mode, perform a portion of a parallel sorting operation on the input data; and
   an accumulator circuit coupled to the plurality of operation circuits, the accumulator circuit configured to:
      in the first mode, receive and store first results of the multiply-add operations, and
      in the second mode, receive and store second results of the parallel sorting operation.

2. The neural engine circuit of claim 1, wherein the second results of the parallel sorting operation are sent to the plurality of operation circuits, in the second mode, to perform a subsequent portion of the parallel sorting operation.

3. The neural engine circuit of claim 1, wherein the parallel sorting operation implements a bitonic sorting network that simultaneously produces a maximum value and a minimum value of the input data.

4. The neural engine circuit of claim 1, wherein the accumulator circuit is further configured to, in the second mode, receive and store an index for a maximum value of the input data and an index for a minimum value of the input data.

5. The neural engine circuit of claim 1, wherein each of the plurality of operation circuits comprises:
 a multiplier circuit configured to receive and perform a multiplication operation on a portion of the input data and a portion of the kernel in the first mode;
 an adder circuit coupled to the multiplier circuit and the accumulator circuit, the adder circuit configured to receive and perform an adding operation on the stored first results and a value derived from the multiplication operation in the first mode; and
 a comparator circuit coupled to the accumulator circuit, the comparator circuit configured to receive and perform a comparison operation on a portion of the input data and the stored second results in the second mode.

6. The neural engine circuit of claim 1, further comprising an input buffer circuit coupled to the plurality of operation circuits to provide different sets of the input data to the plurality of operation circuits in different cycles of the neural engine circuit.

7. The neural engine circuit of claim 1, wherein another neural engine circuit performs another portion of the parallel sorting operation in parallel with the neural engine circuit.

8. The neural engine circuit of claim 1, wherein the input data comprises a plurality of input data elements, and the plurality of operation circuits is further configured to perform a portion of the parallel sorting operation on the plurality of input data elements in the second mode.

9. A method of operating a neural engine circuit, the method comprising:
 in a first mode:
  receiving, by a kernel extract circuit, kernel data from a memory coupled to the neural engine circuit; and
  obtaining, by the kernel extract circuit, a kernel from the kernel data;
 in a second mode:
  receiving a command from a neural engine control circuit that causes the kernel extract circuit to be disabled in a second mode;
 receiving, by a plurality of operation circuits of the neural engine circuit, input data;
 in the first mode, performing, by the plurality of operation circuits, multiply-add operations of a convolution on the input data using the kernel obtained by the kernel extract circuit;
 in the second mode, performing, by the plurality of operation circuits, a portion of a parallel sorting operation on the input data;
 in the first mode, receiving, by an accumulator circuit of the neural engine circuit coupled to the plurality of operation circuits, first results of the multiply-add operations to store; and
 in the second mode, receiving, by the accumulator circuit, second results of the parallel sorting operation to store.

10. The method of claim 9, further comprising:
 in the second mode, sending, the second results of the parallel sorting operation to the plurality of operation circuits to perform a subsequent portion of the parallel sorting operation.

11. The method of claim 9, wherein the parallel sorting operation implements a bitonic sorting network that simultaneously produces a maximum value and a minimum value of the input data.

12. The method of claim 9, further comprising:
 in the second mode, receiving, by the accumulator circuit, an index for a maximum value of the input data and an index for a minimum value of the input data to store.

13. The method of claim 9, further comprising:
 in the first mode, receiving, by a multiplier circuit in each of the plurality of operation circuits, a portion of the input data and a portion of the kernel to perform a multiplication operation on the portion of the input data and the portion of the kernel;
 in the first mode, receiving, by an adder circuit coupled to the multiplier circuit and the accumulator circuit, the stored first results and a value derived from the multiplication operation to perform an adding operation on the stored first results and the value derived from the multiplication operation; and
 in the second mode, receiving, by a comparator circuit in each of the plurality of operation circuits coupled to the accumulator circuit, the portion of the input data and the stored second results to perform a comparison operation on the portion of the input data and the stored second results.

14. The method of claim 9, further comprising:
 providing, by an input buffer circuit coupled to the plurality of operation circuits, different sets of the input data to the plurality of operation circuits in different cycles of the neural engine circuit.

15. The method of claim 9, wherein another neural engine circuit performs another portion of the parallel sorting operation in parallel with the neural engine circuit.

16. The method of claim 9, wherein the input data comprises a plurality of input data elements, and the plurality of operation circuits is further configured to perform a portion of the parallel sorting operation on the plurality of input data elements in the second mode.

17. An electronic device, comprising:
 at least one neural engine circuit, comprising:
  a neural engine control circuit;
  a kernel extract circuit configured to:
   in a first mode:
    receive kernel data from a memory coupled to the at least one neural engine circuit; and
    obtain a kernel from kernel data; and
   in a second mode:
    receive a command from the neural engine control circuit that causes the kernel extract circuit to be disabled;
  a plurality of operation circuits configured to:
   receive input data,
   in the first mode, perform multiply-add operations of a convolution on the input data using the kernel obtained by the kernel extract circuit, and
   in the second mode, perform a portion of a parallel sorting operation on the input data; and
  an accumulator circuit coupled to the plurality of operation circuits, the accumulator circuit configured to:

in the first mode, receive and store first results of the multiply-add operations, and in the second mode, receive and store second results of the parallel sorting operation.

18. The electronic device of claim 17, wherein the second results of the parallel sorting operation are sent to the plurality of operation circuits, in the second mode, to perform a subsequent portion of the parallel sorting operation.

19. The electronic device of claim 17, wherein each of the plurality of operation circuits comprises:

a multiplier circuit configured to receive and perform a multiplication operation on a portion of the input data and a portion of the kernel in the first mode;

an adder circuit coupled to the multiplier circuit and the accumulator circuit, the adder circuit configured to receive and perform an adding operation on the stored first results and a value derived from the multiplication operation in the first mode; and a comparator circuit coupled to the accumulator circuit, the comparator circuit configured to receive and perform a comparison operation on a portion of the input data and the stored second results in the second mode.

20. The electronic device of claim 17, wherein the at least one neural engine circuit further comprises an input buffer circuit coupled to the plurality of operation circuits to provide different sets of the input data to the plurality of operation circuits in different cycles of the at least one neural engine circuit.

* * * * *